United States Patent

[11] 3,602,901

[72] Inventor Dixson Teh-Chao Jen
Monroe, Conn.
[21] Appl. No. 872,925
[22] Filed Oct. 31, 1969
[45] Patented Aug. 31, 1971
[73] Assignee The Bunko-Ramo Corporation
Canoga Park, Calif.

[54] CIRCUIT FOR CONTROLLING THE LOADING AND EDITING OF INFORMATION IN A RECIRCULATING MEMORY
8 Claims, 5 Drawing Figs.

[52] U.S. Cl. .......... 340/172.5
[51] Int. Cl. .......... G06f 1/00, G06f 13/00
[50] Field of Search .......... 340/172.5

[56] References Cited
UNITED STATES PATENTS

| | | | |
|---|---|---|---|
| 3,312,948 | 4/1967 | Capozzi | 340/172.5 |
| 3,315,234 | 4/1967 | Ruth | 340/172.5 |
| 3,374,466 | 3/1968 | Hanf et al. | 340/172.5 |
| 3,401,375 | 9/1968 | Bell et al. | 340/172.5 |

*Primary Examiner*—Paul J. Henon
*Assistant Examiner*—R. F. Chapuran
*Attorney*—Frederick M. Arbuckle

ABSTRACT: A circuit for controlling the loading and editing of information in a recirculating memory. A coded input character is converted, in a suitable encoding circuit, into a multibit-coded instruction. A first group of bits in the instruction are utilized to control the location in the memory at which the execution of the instruction begins, a second group of bits in the instruction are utilized to control the location in the memory at which the execution of the instruction ends, and a third group of bits in the instruction are utilized to control the action performed on information during the execution of the instruction. A fourth group of bits in the instruction may be utilized to control the character position in the memory at which an entry marker is stored when the execution of the instruction is completed.

Figures 1, 1A:
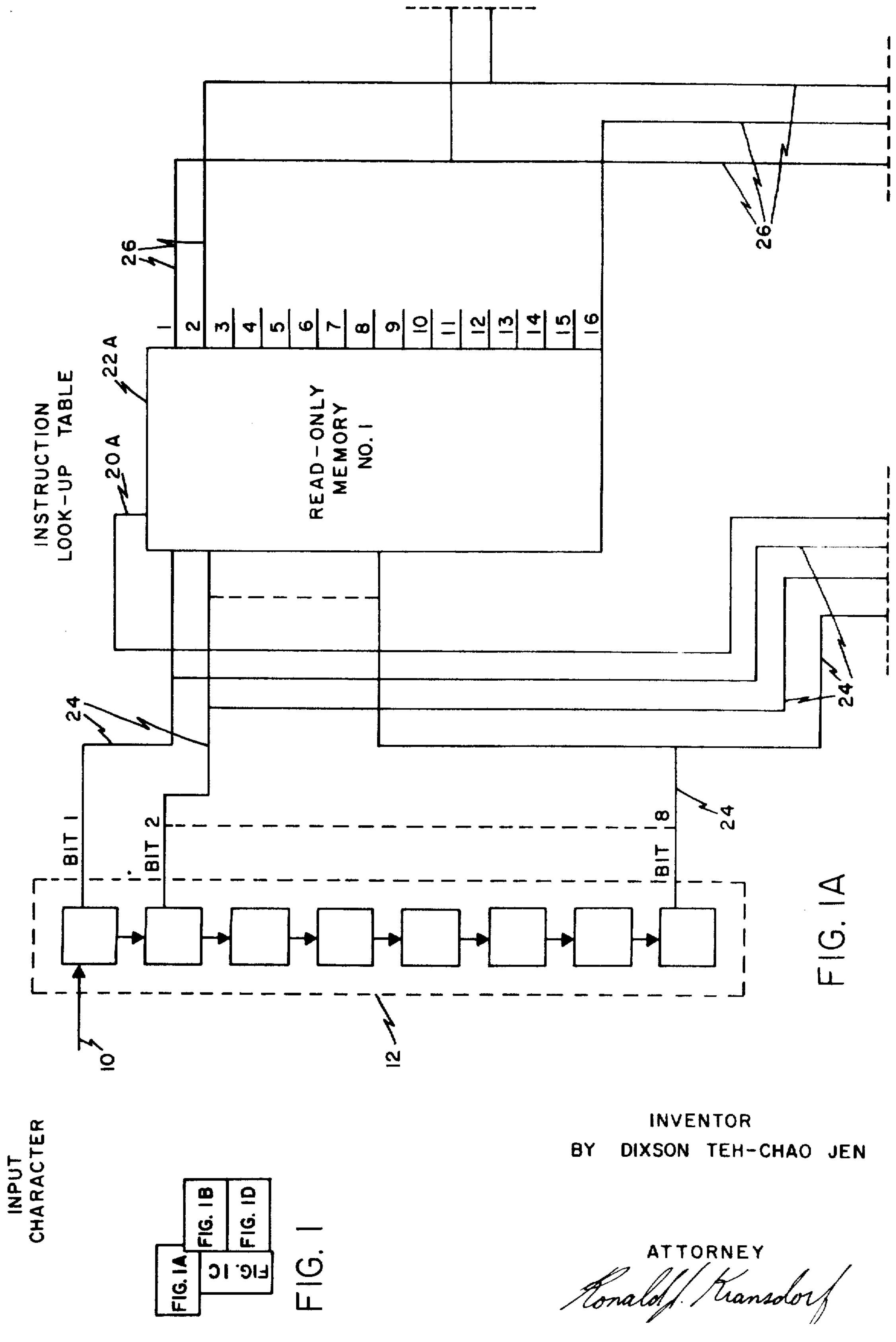
Figure 1B:
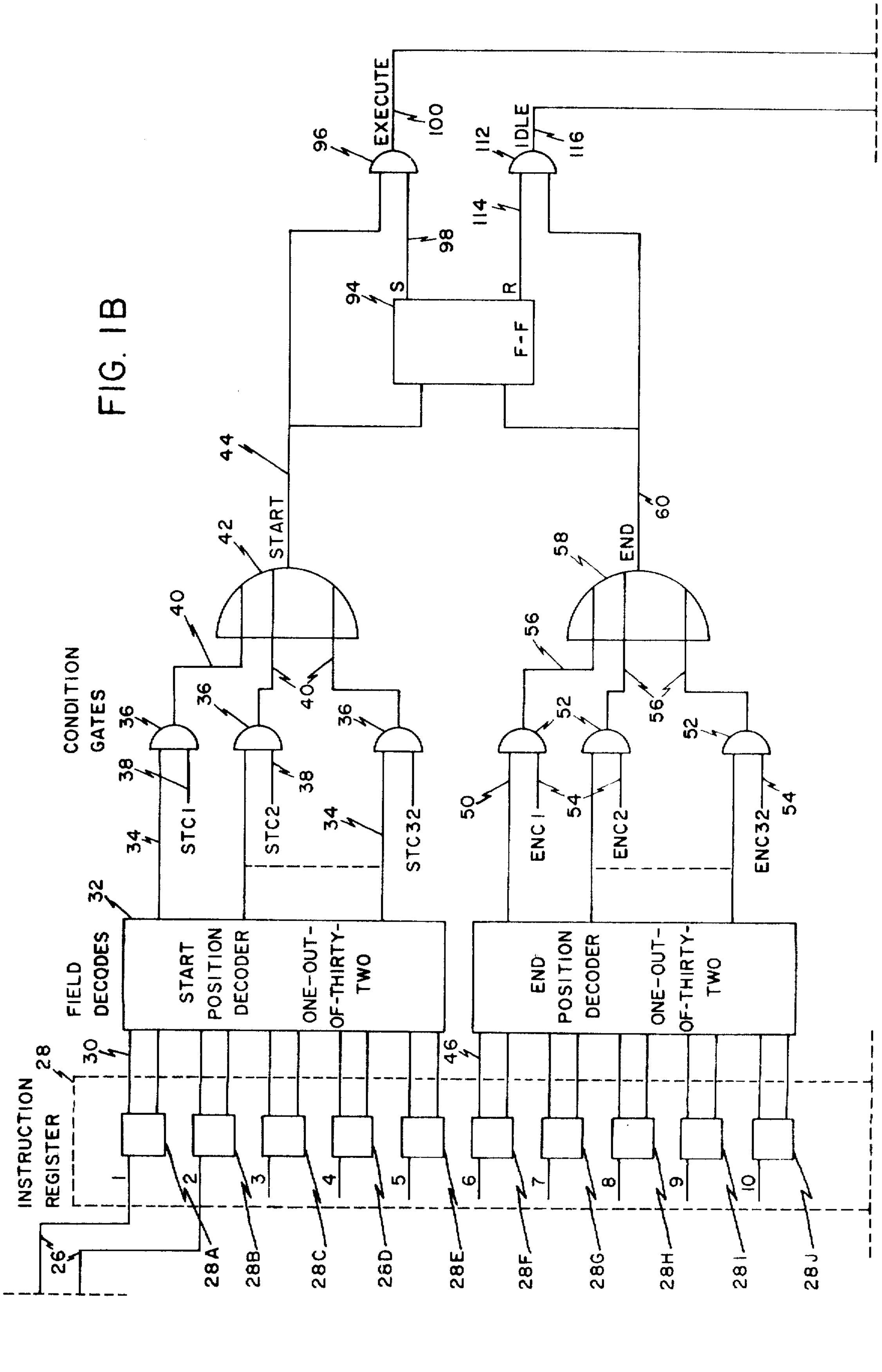
Figure 1C:
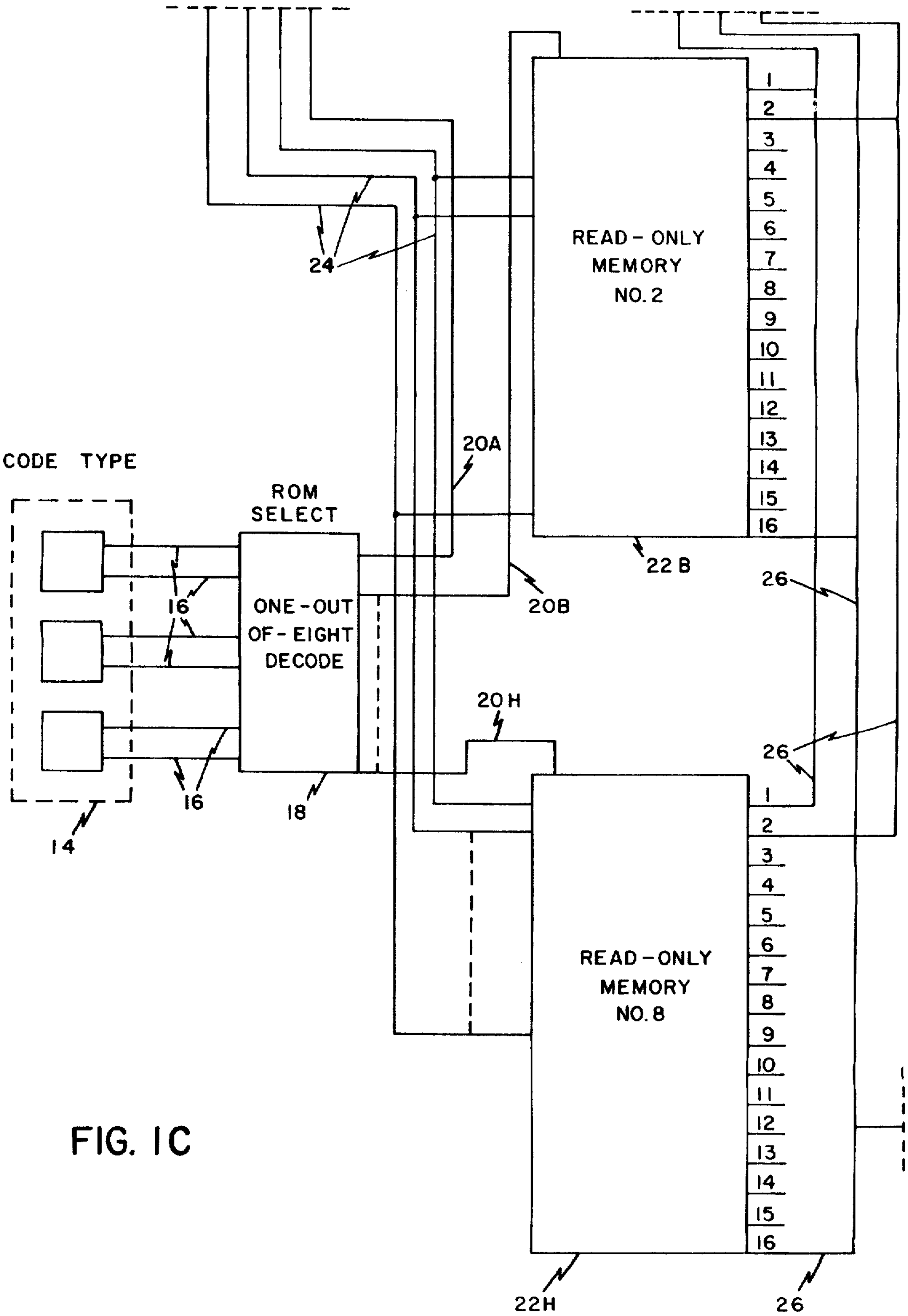
Figure 1D:
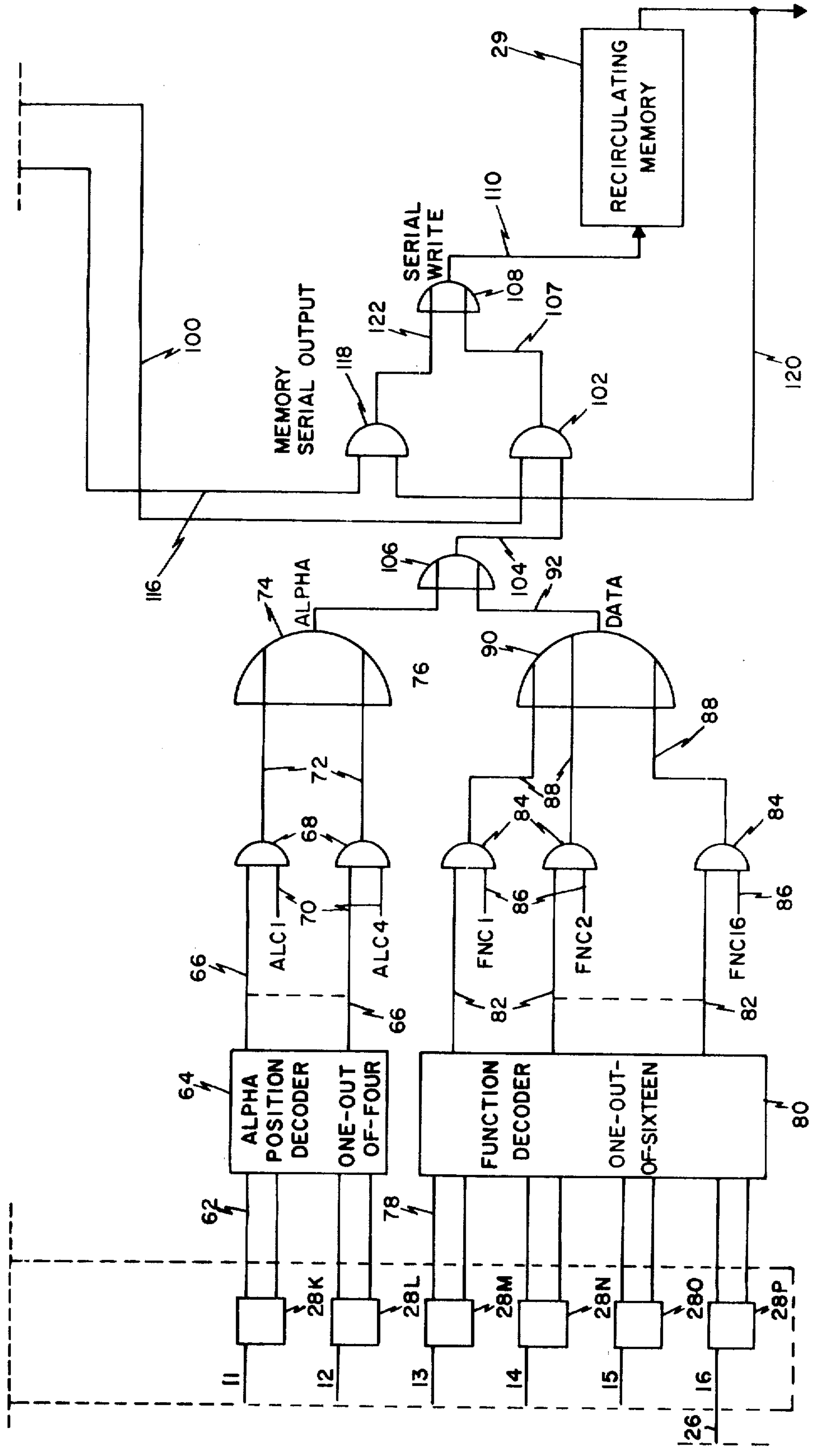

INVENTOR
BY DIXSON TEH-CHAO JEN

ATTORNEY
Ronald J. Kransdorf

CIRCUIT FOR CONTROLLING THE LOADING AND EDITING OF INFORMATION IN A RECIRCULATING MEMORY

This invention relates to a circuit for controlling the loading and editing of information in a recirculating memory, and more particularly to a circuit for constructing a generalized instruction format which may be utilized to cause any desired editing or loading function to be performed.

Information stored in a recirculating storage medium such as a delay line, magnetic drum, or magnetic disk, may be utilized to control the display on a cathode-ray tube (CRT), to control a printing operation, or for some other control function. Such applications generally require that the circuitry for controlling the loading of information into the memory also be capable of performing various editing functions. Such editing functions might, for example, include tab, step right, step left, clear, home, carriage return-line feed, and the like.

Heretofore, in such applications, an input decode gate has been provided for each desired editing function with a separate multilevel logic circuit being associated with each gate. As long as only a relatively few editing functions are required, the above procedure causes no problem. However, CRT terminals are becoming increasingly popular, and the number of editing functions which are required, as the applications of these devices proliferate, is becoming both large and varied. The set of editing functions required tends to differ for each application, requiring that the logic design be to some extent customized, and even for the same application, the input codes may vary and the editing functions required change with time. However, since existing circuits require a significant amount of decode and control logic to be changed each time an editing function change is made, such changes become relatively difficult and expensive. This is particularly true when a change is required on a system which is already in the field.

It is thus apparent that in order for recirculating memory control units to achieve optimum versatility, an improved means of loading information into these memories must be provided. This means should be relatively independent of the input code, and should permit the number and type of editing function to be easily varied, both from a design and circuit implementation standpoint.

It is therefore a primary object of this invention to provide an improved circuit for controlling the loading and editing of information in a recirculating memory.

A more specific object of this invention is to provide a circuit which permits the editing functions which may be performed on information stored in a recirculating memory to be easily and inexpensively altered.

Another object of this invention is to provide an input control circuit for recirculating memory which is relatively independent of the input code utilized.

In accordance with these objects this invention provides a circuit for controlling the loading and editing of information in a recirculating memory. The circuit includes a means for applying a coded input character to the circuit and a means responsive to the input character for generating a coded multibit instruction. Means are provided which are responsive to a first selected group the execution the instruction bits for controlling the location in memory in which the execution of the instruction begins, and means are provided which are responsive to a second selected group of the instruction bits for controlling the location in memory at which the execution of the instruction ends. A means responsive to a third selected group of the instruction bits controls the action performed on the information during the execution of the instruction. If the memory is of a type which utilizes an entry marker to indicate the character position in which the next input character is normally to be stored, the circuit also includes a means responsive to a fourth selected group of the instruction bits for controlling the character position in which the entry marker is stored when the execution of the instruction is completed.

The foregoing and other objects, features and advantages of the invention will be apparent from the following more particular description of preferred embodiment of the invention as illustrated in the accompanying drawings.

FIGS. 1A–1D, when combined as shown in FIG. 1 form a schematic block diagram of an illustrative embodiment of the invention.

Referring now to FIG. 1A, it is seen that an input character received on line 10 is stored in a multibit input buffer register 12. For purposes of illustration, bits have been shown as being serially received on line 10, as would be the case, for example, where line 10 is the output from a transmission line, and register 12 has therefore been shown as a shift register. However, in some applications, such as where input characters are derived from a local keyboard, the input character may be received in parallel. The number of bit positions in register 12, shown for purposes of illustration as eight, would depend on the input code or codes utilized.

The circuit also includes a 3-bit register 14 in which the code type is stored. Thus, the input code could be a 5-bit code, a 6-bit code, a 7-bit code, etc., and there could be several different code types for each number of bits. Register 14 may, for example, by manually loaded by suitable means such as thumb-wheel switches. Output lines 16 from register 14 are connected to a decode circuit 18 which, for each combination of inputs on lines 16, generates an output on one of the eight output lines 20. Decoder 18 may be a diode matrix, a small read-only memory, or some other standard decoder circuit. Lines 20 are applied as conditioning inputs to corresponding read-only memories (ROM's) 22. Thus, there is a read-only memory 22 for each code type which the circuit may be called upon to handle. The ROM's may, for example, be suitably patterned metal-oxide semiconductor (MOS) memories.

In operation, when an indication, such as an end-of-character or a buffer-full signal, is generated in a standard way to indicate that there is a full character in buffer 12, the character in the buffer is gated in parallel through lines 24 to each of the read-only memories 22. The read-only memory which is activated at the time by a signal on its corresponding line 20 accepts the input code and generates a corresponding 16-bit instruction on its output lines 26 which instruction is stored in instruction register 28. Each of the read-only memories 22 is thus being utilized in the circuit as an 8-bit (or less) to 16-bit encoder. The particular instruction generated by each ROM for each input character will be unique; but, for a given input character, each of the ROM's may generate a different instruction. It should also be noted that the instruction generated as a result of a particular input may be easily varied by reprogramming or replacing the appropriate ROM. This is a far simpler operation than that which is required to design and install new decode gate and instruction logic as is presently required. Further, since the instruction generated for a particular editing or other function is the same regardless of the input character which caused it to be generated, the operation logic of the circuit, which will now be described, is totally independent of the input code.

The instruction stored in register 28 may be utilized to control loading and editing of information in recirculating memory 29 by utilizing the fact that no matter what the editing function is, the action to be taken can be determined by answering the following questions:

1. How does the action begin? Does it originate at a fixed location in the memory or does it begin upon the detection of a certain condition or content in the memory?
2. When and where does the action end? Again, is it related to a fixed location in memory or is it based on the detection of a certain condition or content?
3. What happens to the data content of the memory during the action period? Is it altered, erased, or overwritten?

In most applications of this invention, an entry marker is stored in the character position of memory in which the next character to be stored would normally be written. With this standard memory storage technique, the entry marker is erased each time a new character is written and is rewritten in the next following character position. If the memory is of a type which utilizes an entry marker, then the following question must also be answered in order to completely characterize the editing function.

4. Is the entry marker relocated as a result of the action; and if so, whereto?

The answers to the above four questions for a number of common loading and editing functions in a typical system is shown in the following table:

| Editing function | Start | End | Data | Write alpha |
|---|---|---|---|---|
| Home | Line 1, CH 1 | Last line, last character | Recirculated | Line 1, CH 1. |
| Clear | do | do | Inhibited | Do. |
| Step/scan right | Alpha detection | Next character | Recirculated | When end. |
| Erase line | do | CH 1 (next line) | Inhibited | Do. |
| CRLF | do | do | Recirculated | Do. |
| Ordinary character write | do | Next character | Character code | Do. |
| Step/scan left | Alpha detection minus 2 | do | Recirculated | When start. |

The above table reveals that not only are the four indicated conditions necessary and sufficient to define an editing function, but that there are also a limited number of possible alternatives for each of these conditions. It also indicates that a given alternative may be utilized for a number of different editing functions. Thus, a circuit which provides all of the possible alternatives for each of the four conditions would be capable of performing any conceivable editing function.

In implementing the above concepts, it has been assumed for the embodiment of the invention shown in FIGS. 1A–1D that there are 32 possible alternatives for the position in which the action may be started. Thus, the first five of the bits in the instruction register 28 are applied as inputs to start-position decoder 32. Decoder 32 converts the bits on some combination of the ten input lines 30 into a signal of one of the 32 output lines 34, each of which lines corresponds to a different start condition alternative. The lines 34 are applied as conditioning inputs to gates 36 each of which has as its other input a line 38 which has a signal on it at the time required for the corresponding start alternative. Thus, the line 38 which is designated as STC1 may be energized by the combination of a line 1 and character 1 clock. These clock signals could be derived from standard character counters associated with memory 29. The line 38 designated STC2 may be energized when the cursor or alpha bit is detected. Other of the lines 38 may be energized by other clock signal combinations or as the result of the detection of other characters or conditions in the memory. Output lines 40 from AND gates 36 are applied as inputs to OR gate 42. The manner in which the start output line 44 from OR gate 42 is utilized will be described shortly.

It has been similarly assumed that there are 32 possible alternatives for the end condition. Therefore, the five instruction bits contained in instruction register position 28F–28J are applied through lines 46 as inputs to end-position decoder 48. This decoder is identical to decoder 32 and is effective, in response to each combination of inputs on the lines 46, to generate an output on one of the 32 lines 50. Each of these lines corresponds to a single end condition alternative and is connected as a conditioning input to a gate 52. The other input to each of the gates 52 is a line 54 which is energized when the required end condition occurs. Thus, the signal on the first of the lines 54, the line designated ENC1, may occur at bit 1 time of each character, or a flip-flop may be set when the start condition occurs and a set output from the flip-flop, in conjunction with a bit 1 clock, may cause a signal to appear on the ENC1 line. The signal on the line 54 designated ENC2 may be obtained by ANDing together the clocks which occur at the beginning of the last character in the memory. The signals on the other lines 54 may be similarly derived by combining clock pulses or as a result of the detection of some character or other condition in the memory. Output lines 56 from gates 54 are connected as the inputs to OR gate 58. The manner in which the END output line 60 from OR gate 58 is utilized will be described shortly.

Only four possible conditions have been assumed for the new location of the alpha bit. Therefore, only two bits of the instruction in register 28 are assigned to designate this function. The outputs from bit positions 28K and 28L of register 28 are applied through lines 62 to alpha position decoder 64. This circuit accepts the combination of inputs on the lines 62 and generates an output on one of four lines 66. Each of the lines 66 corresponds to a different possible alternative for the relocation of the alpha bit. The lines 66 are connected as a conditioning input to corresponding gates 68. The other input to each of the gates 68 is a line 70 which has a signal on it when the condition called for by the corresponding line 66 occurs. Thus, the line 70 designated ALC1 may in fact be the END line 60. Thus, a conditioning of the corresponding gate would cause the alpha to be written in the character position which occurs when the required action has been completed. The line 70 designated ALC4 may, on the other hand, be energized by the combination of clock signals which occur in the first bit position of the memory. The other lines 70 might be similarly energized as a result of the occurrence of selected clocks or other conditions. Output lines 72 from gates 68 are connected as the inputs to OR gate 74. The manner in which the ALPHA output line 76 from OR gate 74 is utilized will be described shortly.

Finally, 16 possible alternatives have been provided for the action or function which may be performed on the information. Thus, the bit in the last four bit positions of register 28, bit positions 28M–28P, are connected through lines 78 as the inputs to function decoder 80. Decoder 80 functions in the same manner as the other decoder circuits to generate an output on one of 16 lines 82 in response to the input code on lines 78. Each line 82 corresponds to a different function which the circuit is capable of performing and is connected as a conditioning input to a gate 84. The other input to each of the gates 84 is a line 86 which corresponds to the required function. Thus, the signal on the first of the lines 86, designated FNC1, may be coded signals representing a new character which is to be written into memory. These signals may be derived from input register 12, or may be a selected prestored character or character combination. The signal on the second of the lines 86, designated FNC2, may be an all zeros character which is effective to clear what has previously been stored. The signal on the last of the lines 86, designated FNC16, may be a signal which permits information in memory to recirculate without alteration. Output lines 88 from gates 86 are connected through OR gate 90 to DATA line 92. The manner in which the DATA line 92 is utilized will be described shortly.

A signal appearing on start line 44 is effective to set flip-flop 94, and is also applied as one of the inputs to OR gate 96. The other input to OR gate 96 is the set-side output line 98 from flip-flop 94. Thus, OR gate 96 is effective to generate an output signal on EXECUTE line 100 when flip-flop 94 is either set or being set.

EXECUTE line 100 is connected as the conditioning input to gate 102. The information input to gate 102 is output line 104 from OR gate 106. The inputs to OR gate 106 are ALPHA line 76 and DATA line 92. Thus, when a signal appears on EXECUTE line 100, the writing of an alpha bit is permitted at the appropriate point in the memory and the function called for by the instruction in register 28 may be performed. OUtput line 107 from gate 102 is connected through OR gate 108 and line 110 to the input of recirculating memory 29.

A signal on END line 60 is applied to the reset input of flip-flop 94 and as one of the inputs to OR gate 112. The other input to OR gate 112 is reset output line 114 from flip-flop 94. Thus, OR gate 112 is generating an output on IDLE line 116 when flip-flop 94 is either in its reset condition or is being reset. The signal on line 116 is applied as a conditioning input to gate 118. The information input to gate 118 is output line 120 from the recirculating memory 29. Output line 122 from gate 118 is connected through OR gate 108 and line 110 to the input of the recirculating memory. Thus, when the circuit is in its IDLE condition, the information in the memory is recirculated and may not be altered. Output line 120 from the memory may be utilized to control the display on a CRT or for any other desired function.

A circuit has thus been provided for performing any desired editing function on information stored in a recirculating memory while requiring a minimum of logic circuitry. The editing functions which the circuit is adapted to perform may be altered with relative ease and the input code for the circuit may also be changed either by switching to a different ROM as shown, or, in applications where the circuit is adapted to receive only a single code, by substituting an ROM which is programmed for the desired code. Since an ROM may be formed on a single printed circuit card, the above changes are relatively simple operations. In any event, since the circuit logic depends only on the instruction code stored in register 28, the circuit logic operates independent of the input code type and of the code character for the editing functions.

It should be apparent that while a 16-bit instruction has been provided for the illustrative embodiment of the invention, the size of this instruction will depend solely on the number of start conditions, end conditions, write-alpha conditions, and functions which may exist in the system in which the circuit is utilized. Thus, the number of bits in the instruction, and the manner in which the bits are grouped for utilization in the embodiment of the invention shown in the FIGS. are for purposes of illustration only, and a great variety of other instruction sizes and groupings are possible. It is of course possible to use other encoding means in place of ROMS for the circuits 22, and the number of these circuits may be varied from one to any desired number depending on the number of different input code types which the circuit is adapted to accept. While a separate instruction register 28 has been shown in the FIGS. this register may be dispensed with where the device 22 utilized generates a continuous output. The particular logic circuits disclosed are also for illustration purposes only and will vary depending on the system.

It is therefore apparent that, while the invention has been particularly shown and described with reference to a preferred embodiment thereof, the foregoing and other changes in form and details may be made therein by those skilled in the art without departing from the spirit and scope of the invention.

What is claimed is:

1. A circuit for controlling the loading and editing of information in a recirculating memory comprising:

means for applying a coded input character to said circuit;

means responsive to said input character for generating a coded multibit instruction;

means responsive to a first selected group of said instruction bits for controlling the location in said memory at which the execution of said instruction begins;

means responsive to a second selected group of said instruction bits for controlling the location in said memory at which the execution of said instruction ends; and means responsive to a third selected group of said instruction bits for controlling the action performed on information during the execution of said instruction.

2. A circuit of the type described in claim 1 wherein information is stored in said memory in character positions with an entry marker being stored in the character position in which the next input character would normally be stored; and including means responsive to a fourth selected group of said instruction bits for controlling the character position in which said entry marker is stored when the execution of said instruction is completed.

3. A circuit of the type described in claim 1 wherein said instruction generating means is a read-only memory.

4. A circuit of the type described in claim 1 wherein there are a plurality of said instruction generating means; and including means for selecting the instruction generating means to which a given input character will be applied.

5. A circuit of the type described in claim 4 wherein each of said instruction generating means is responsive to a different input code type.

6. A circuit of the type described in claim 1 wherein each of said means responsive to a selected group of instruction bits including decoder means, and means responsive to each output from the decoder means for generating the desired output at the appropriate time in the memory cycle.

7. A circuit of the type described in claim 6 wherein said decoder output responsive means includes a plurality of gating means, each of which has as one input a corresponding output from the decoder means, and, as the other input, a signal representing the selected condition, information, or time, represented by the decoder output.

8. A circuit of the type described in claim 1 wherein said begin location controlling means and said end location controlling means include a bistable means which is set when the selected begin location is detected and is reset when the selected end location is detected, and means responsive to said bistable means being in its set condition for permitting the loading or editing of information in said memory.